(12) United States Patent
Butter et al.

(10) Patent No.: US 6,549,575 B1
(45) Date of Patent: Apr. 15, 2003

(54) EFFICIENT, FLEXIBLE MOTION ESTIMATION ARCHITECTURE FOR REAL TIME MPEG2 COMPLIANT ENCODING

(75) Inventors: Adrian Stephen Butter, Binghamton, NY (US); John Mark Kaczmarczyk, Endicott, NY (US); Agnes Yee Ngai, Endwell, NY (US); Edward Francis Westermann, Endicott, NY (US); Robert J. Yagley, Endicott, NY (US)

(73) Assignee: International Business Machines Corporation., Armonk, NY (US)

( * ) Notice: Subject to any disclaimer, the term of this patent is extended or adjusted under 35 U.S.C. 154(b) by 1059 days.

(21) Appl. No.: 08/745,584

(22) Filed: Nov. 7, 1996

(51) Int. Cl.[7] .................................................. H04N 7/32
(52) U.S. Cl. .............................................. 375/240.16
(58) Field of Search ........................ 348/384, 390, 348/400–403, 405, 407, 409–413, 415, 416, 419, 420, 699; 382/232, 236, 238; 375/240.12, 240.13, 240.14, 240.15, 240.16, 240.24; H04N 7/137, 7/32

(56) References Cited

U.S. PATENT DOCUMENTS

| | | | | |
|---|---|---|---|---|
| 5,412,435 A | * | 5/1995 | Nakajima ................... | 348/699 |
| 5,414,469 A | * | 5/1995 | Gonzales et al. ........... | 348/416 |
| 5,448,310 A | * | 9/1995 | Kopet et al. ................ | 348/699 |
| 5,500,678 A | * | 3/1996 | Puri ............................ | 348/405 |
| 5,526,054 A | * | 6/1996 | Greenfield et al. ......... | 348/403 |
| 5,694,170 A | * | 12/1997 | Tiwari et al. ................ | 348/390 |
| 5,715,008 A | * | 2/1998 | Sekiguchi et al. .......... | 348/416 |
| 5,719,632 A | * | 2/1998 | Hoang et al. ............... | 348/419 |
| 5,761,398 A | | 6/1998 | Legall ......................... | 395/114 |

OTHER PUBLICATIONS

Le Gall, "The MPEG video compression algorithm," Signal Processing: Image Communication, vol. 4 (1992) pp. 129–140.
MPEG: A Video Compression Standard for Multimedia Applications. By D. LeGall.
Motion Video Adaptive Quantization In The Transfor By C. Gonzales & E. Viscito pp. 374–378.
C–Cube MPEG Video Procesor By Purcell, S. Galbi D. pp. 24–29.
Video Compression Techniques By. N.K. Lodge 2/1–2/14.
Encoding of Motion Video Sequences for the MPEG By Viscito, E. Gonzales, C.A. pp. 1572–1576.

* cited by examiner

*Primary Examiner*—Richard Lee
(74) *Attorney, Agent, or Firm*—Richard M. Goldman; John R. Pivnichny; William H. Steinberg (57) ABSTRACT

Temporal compression of a digital video data stream with hierarchically searching in at least one search unit for pixels in a reference picture to find a best match for the current macroblock. This is followed by constructing a motion vector between the current macroblock and the best match macroblock in the reference picture.

14 Claims, 10 Drawing Sheets

| SEARCH MODE | PICTURE STRUCTURE | PICTURE TYPE | MOTION EST. OPTIONS | # OF SEARCHES | SEARCH TYPES | SEARCH SIZE |
|---|---|---|---|---|---|---|
| HIER | INTERLACED | I,P | NO DP, 1REF | 1 | OP | +/- 4H<br>+/- 1V |
| HIER | INTERLACED | I,P | NO DP, 2 REF | 2 | OP, SP | +/- 4H<br>+/- 1V |
| HIER | INTERLACED | I,P | DP, 2 REF | 2 | OP, SP | +/- 4H<br>+/- 1V |
| HIER | INTERLACED | B | NO DP, 2 REF | 6 | OP(PR),<br>SP(PR),<br>OP(FR),<br>SP(FR),<br>OP(BR),<br>SP(BR) | +/- 4H<br>+/- 1V |
| HIER | PROGRESSIVE | I,P | NO DP | 5 | F1/F2,<br>F1/F1,<br>F2/F1,<br>F2/F2,<br>FRAME | +/- 4H<br>+/- 1V |
| HIER | PROGRESSIVE | I,P | DP | 3 | F1/F2',<br>F2/F1',<br>FRAME | +/- 4H<br>+/- 1V |

FIG.9

| HIER | | B | | | | |
|---|---|---|---|---|---|---|
| | PROGRESSIVE | | NO DP | 9 | f1/fx(PR), f2/fx(PR), FRAME(PR), f1/fx(FR), f2/fx(FR), FRAME(FR), f1/fx(BR), f2/fx(BR), FRAME(BR) | +/- 4H, +/- 1V |
| NON-HIER | INTERLACED | I,P | NO DP, 1 REF | 1 | OP | +/- 8H, +/- 7V |
| NON-HIER | INTERLACED | I,P | NO DP, 2 REF | 2 | OP, SP | +/- 8H, +/- 7V |
| NON-HIER | INTERLACED | I,P | DP, 2 REF | 1 | OP | +/- 8H, +/- 7V |
| NON-HIER | PROGRESSIVE | I,P | NO DP | 5 | f1/f1, f1/f2, f2/f1, f2/f2, FRAME | +/- 8H, +/- 7V |
| NON-HIER | PROGRESSIVE | I,P | DP | 5 | f1/f1, f1/f2, f2/f1, f2/f2, FRAME | +/- 8H, +/- 7V |

FIG. 10

EFFICIENT, FLEXIBLE MOTION ESTIMATION ARCHITECTURE FOR REAL TIME MPEG2 COMPLIANT ENCODING

FIELD OF THE INVENTION

The invention relates to real time motion estimation in MPEG2 compliant digital video encoding. Motion estimation is the compression between pictures through the use of motion vectors. According to the invention temporal compression of a digital video data stream is carried out by hierarchically searching in at least one search unit for pixels in a reference picture to find a best match macroblock for the current macroblock. This is followed by constructing a motion vector between the current macroblock and the best match macroblock in the reference picture.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and videoconferencing to subscribers, an enormous amount of network bandwidth is required. In fact, network bandwidth is often the main inhibitor to the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real time.

One example of an emerging video compression standard is the MPEG standard. Within the MPEG standard, video compression is defined both within a given picture and between pictures. Video compression within a picture is accomplished via a process of discrete cosine transformation, quantization, and run length encoding. Video compression between pictures is accomplished via a process referred to as motion estimation, in which a motion vector is used to describe the translation of a set of picture elements (pels) from one picture to another. These motion vectors are themselves encoded.

Motion estimation algorithms are repetitive functions which require a large amount of computational power when effectively implemented. This is especially true if motion estimation is being performed in a real time video transmission environment. In addition, two important constraints imposed by system designers are the card/board area consumed by and cost of the components required to perform the video compression function. This particularly includes the amount of DRAM and/or SRAM required to store reference picture data. A need exists for a robust motion estimation dataflow which maximizes computational power to satisfy real time encoding requirements and minimizes the amount of chip area consumed to implement it. There is also a clear need to make the motion estimation dataflow scalable so that numerous system cost points can be attained.

OBJECTS OF THE INVENTION

It is one objective of the invention to provide a robust motion estimation dataflow which maximizes computational power to satisfy real time encoding requirements and minimizes the amount of chip area consumed to implement it.

It is a further objective of the invention to provide the motion estimation dataflow scalable so that numerous system cost points can be attained.

It is a still further objective of the invention to provide a hierarchical motion estimation method and apparatus.

It is a still further objective of the invention to provide a hierarchical motion estimation method and apparatus in which the hierarchical motion estimation search is conducted using downsampled full pixel values.

It is a still further objective of the invention to provide a hierarchical motion estimation method and apparatus in which the hierarchical motion estimation search is a field search.

SUMMARY OF THE INVENTION

These and other objectives are achieved by the method and apparatus described herein.

According to the invention there is provided a method of temporal compression of a digital video data stream. The method starts by hierarchically searching in at least one search unit for pixels in a reference picture to find a best match macroblock therein corresponding to the current macroblock. In the next step a motion vector is constructed between the best match macroblock and the current macroblock.

According to a further embodiment, there is provided a method of temporal compression of a digital video data stream. The method comprises using downsampled full pixel values to search for pixels in a reference picture to thereby find a best match macroblock. By a best match macroblock is meant a macroblock in a reference picture which most closely resembles the current macroblock. The next step is constructing a motion vector between the best match macroblock and the current macroblock.

According to a still further embodiment of the invention there is provides a method of temporal compression of a digital video data stream comprising field searching with even/even, odd/odd, even/odd, and odd/even field search unit inputs. The search is for pixels in a reference picture field to find a best match macroblock therein corresponding to the current macroblock. As before a motion vector is constructed between the best match macroblock and the current macroblock.

THE FIGURES

The invention may be understood by reference to the FIGURES appended hereto.

DETAILED DESCRIPTION OF THE INVENTION

Disclosed is a motion estimation architecture which is scalable and efficient, and performs suitably to meet the stringent demands of real time encoding environments.

The invention relates to MPEG and HDTV compliant encoders and encoding processes. The encoding functions performed by an encoder include data input, motion estimation, macroblock mode generation, data reconstruction, entropy coding, and data output. Motion estimation and compensation are the temporal compression functions. They are repetitive functions with high computational requirements, and they include intensive reconstructive processing, such as inverse discrete cosine transformation, inverse quantization, and motion compensation.

More particularly the invention relates to motion estimation, compensation, and prediction, and even more particularly to the calculation of motion vectors. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous picture to predict where a block of pixels will be in a subsequent picture or pictures, for example, with motion vectors, and to write the result as "predicted pictures" or "P" pictures. More particularly, this involves making a best estimate or prediction of where the pixels or macroblocks of pixels of the i+1$^{th}$ picture will be in the i$^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

Figure 1:
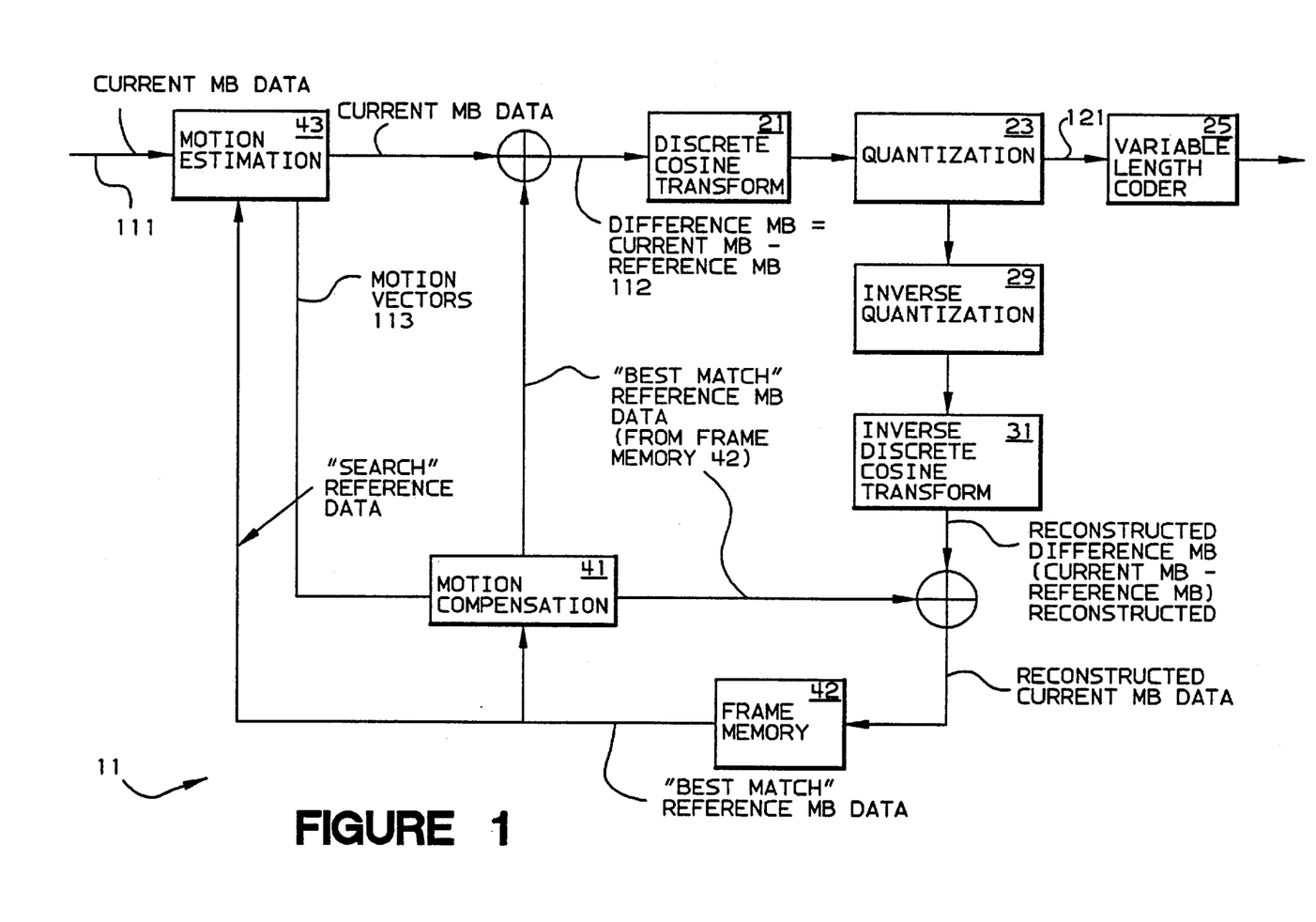
FIG. 1 shows a flow diagram of a generalized MPEG2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113 the picture output 121, the feedback picture for motion estimation and compensation 131, and the motion compensated picture 101. This FIGURE has the assumptions that the $i^{th}$ pictures exists in Frame Memory or Frame Store 42, and that the $i+1^{th}$ picture is being encoded with motion estimation.

For purposes of illustration, a generalized flow chart of MPEG compliant encoding is shown in FIG. 1. In the flow chart the images of the i$^{th}$ picture and the i+1$^{th}$ picture are processed to generate motion vectors. The motion vectors predict where a macroblock of pixels will be in a prior and/or subsequent picture. The use of the motion vectors instead of full images is a key aspect of temporal compression in the MPEG and HDTV standards. As shown in FIG. 1 the motion vectors, once generated, are used for the translation of the macroblocks of pixels, from the i$^{th}$ picture to the i+1$^{th}$ picture.

As shown in FIG. 1, in the encoding process, the images of the i$^{th}$ picture and the i+1$^{th}$ picture are processed in the encoder 11 to generate motion vectors which are the form in which, for example, the i+1$^{th}$ and subsequent pictures are encoded and transmitted. An input image 111X of a subsequent picture goes to the Motion Estimation unit 43 of the encoder. Motion vectors 113 are formed as the output of the Motion Estimation unit 43. These vectors are used by the Motion Compensation Unit 41 to retrieve macroblock data from previous and/or future pictures, referred to as "reference" data, for output by this unit. One output of the Motion Compensation Unit 41 is negatively summed with the output from the Motion Estimation unit 43 and goes to the input of the Discrete Cosine Transformer 21. The output of the Discrete Cosine Transformer 21 is quantized in a Quantizer 23. The output of the Quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in Frame Memory 42. In the encoder shown for purposes of illustration, this second output 131 goes through an inverse quantization 29 and an inverse discrete cosine transform 31 to return a lossy version of the difference macroblock. This data is summed with the output of the Motion Compensation unit 41 and returns a lossy version of the original picture to the Frame Memory 42.

Figure 2:
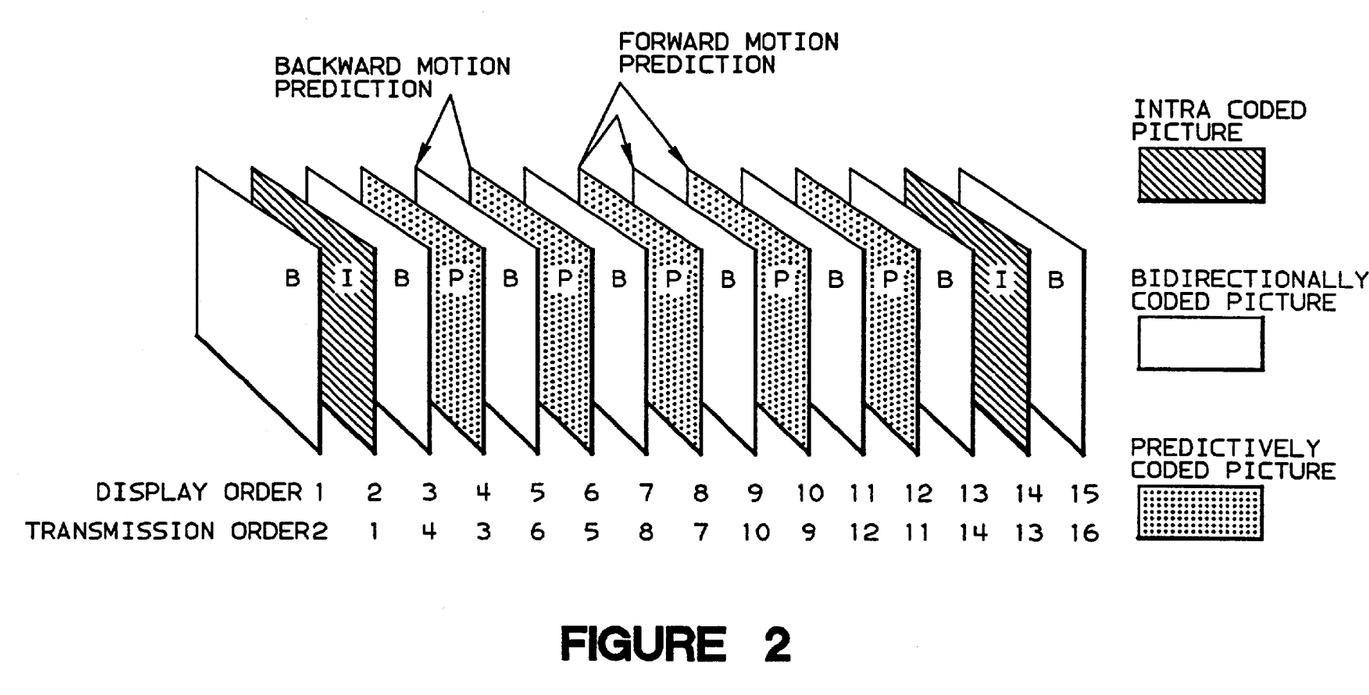
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a source of motion vectors. There are "Predicted pictures" or "P" pictures which are formed by motion vectors from a previous picture and can serve as a source of motion vectors for further pictures. Finally, there are "Bi-directional pictures" or "B" pictures which are formed by motion vectors from two other pictures, one past and one future, and can not serve as a source of motion vectors. Motion vectors are generated from "I" and "P" pictures, and are used to form "P" and "B" pictures.

Figure 3:
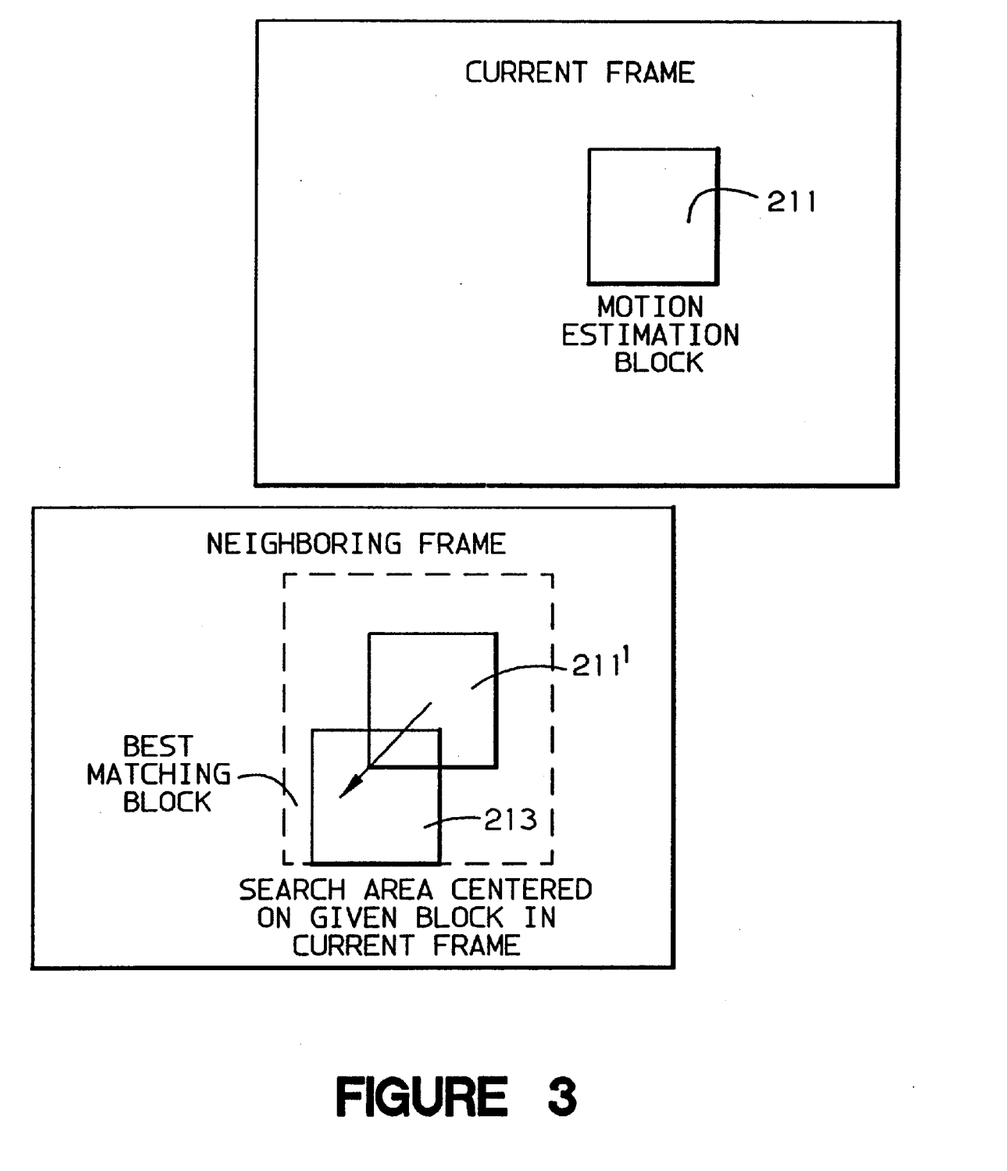
FIG. 3 illustrates the search from the motion estimation block in the current frame or picture to the best matching block in subsequent or previous frame or picture. Elements 211 and 211' represent the same location in both pictures.
Figure 4:
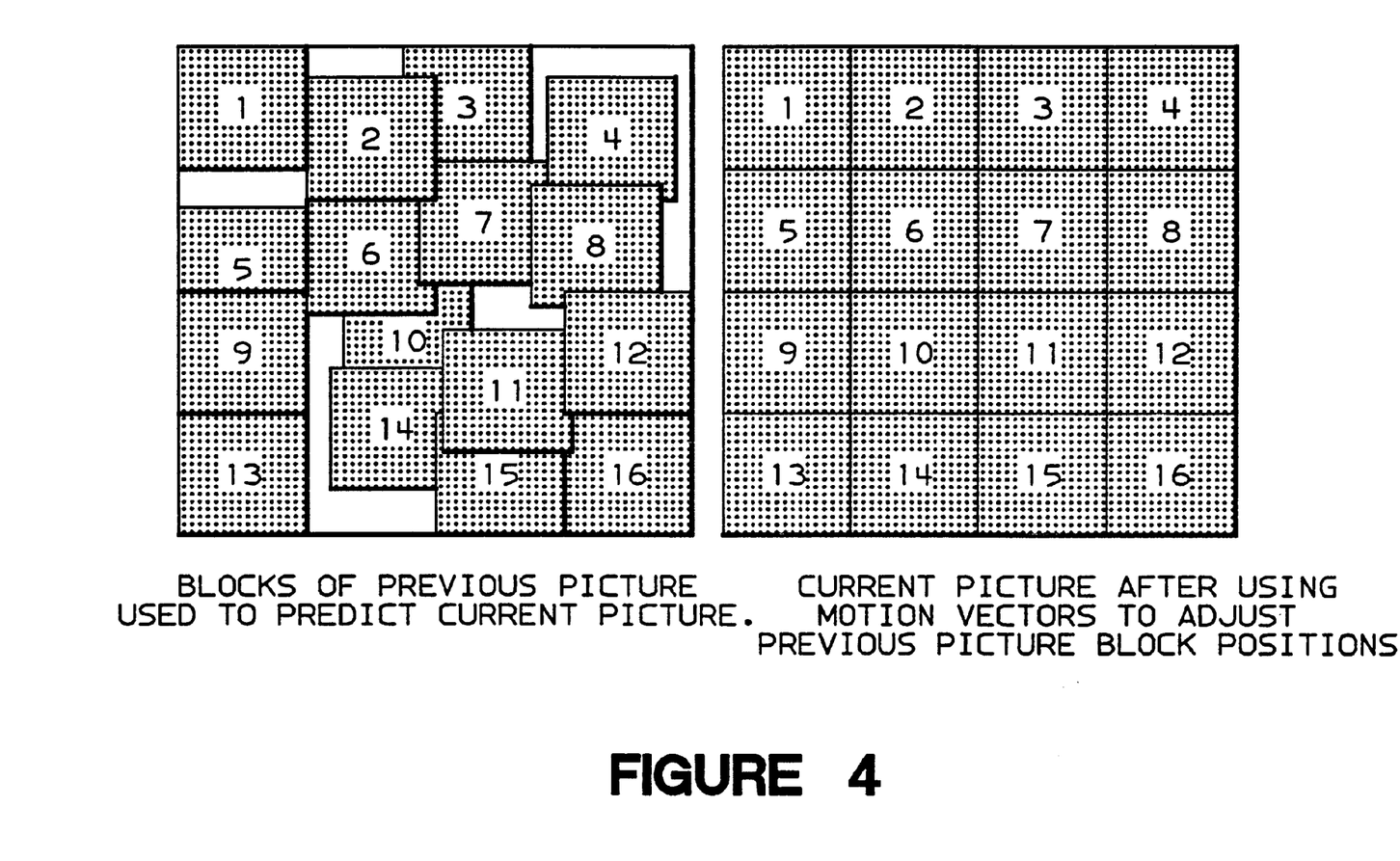
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an i+1$^{th}$ picture throughout a region of the previous picture to find the best match macroblock 213 (211' is the same location as 211 but in the previous picture). Translating the macroblocks in this way yields a pattern of macroblocks for the i+1$^{th}$ picture, as shown in FIG. 4. In this way the i$^{th}$ picture is changed a small amount, e.g., by motion vectors and difference data, to generate the i+1$^{th}$ picture. What is encoded are the motion vectors and difference data, and not the i+1$^{th}$ picture itself. Motion vectors translate position of an image from picture to picture, while difference data carries changes in chrominance, luminance, and saturation, that is, changes in color and brightener.

Returning to FIG. 3, we look for a good match by starting from the same location in the i$^{th}$ picture 211' as in the i+1$^{th}$ picture 211X. A search window is created in the i$^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

FIG. 4 illustrates the movement of blocks in accordance with the motion vectors from their position in a previous picture to a new picture, and the previous picture's blocks adjusted after using motion vectors.

Figure 5:
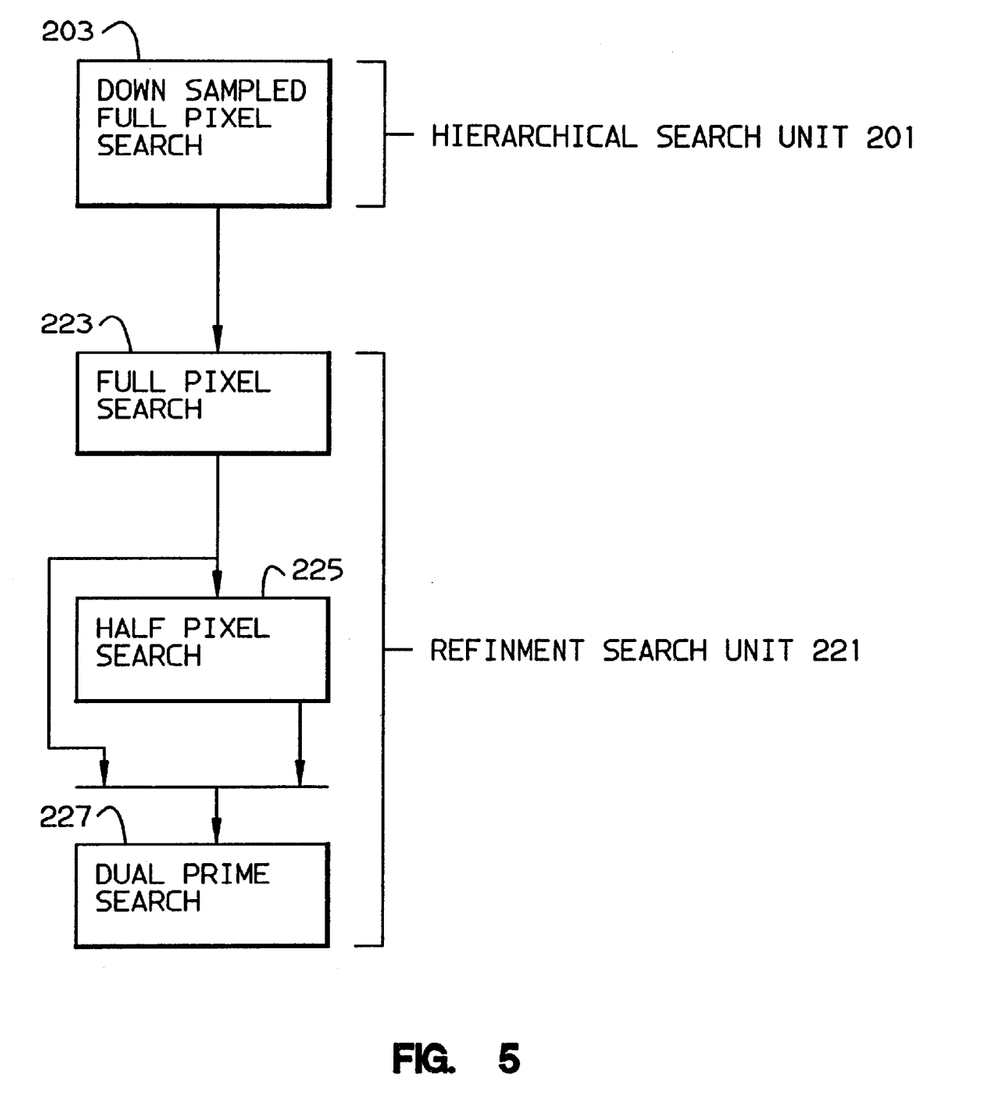
FIG. 5 illustrates the overall architecture of the search unit, with a Hierarchal Search Unit 201 and a Refinement Search Unit 221. The Hierarchal Search Unit 201 has a Downsampled Full Pixel Search Unit 203. The Refinement Search Unit 221 has a Full Pixel Search Unit 223 which provides input to both a Half Pixel Search Unit 225 and a Dual Prime Search Unit 227. The Dual Prime Search Unit 227 also receives input from the Half Pixel Search Unit 225.
Figure 6:
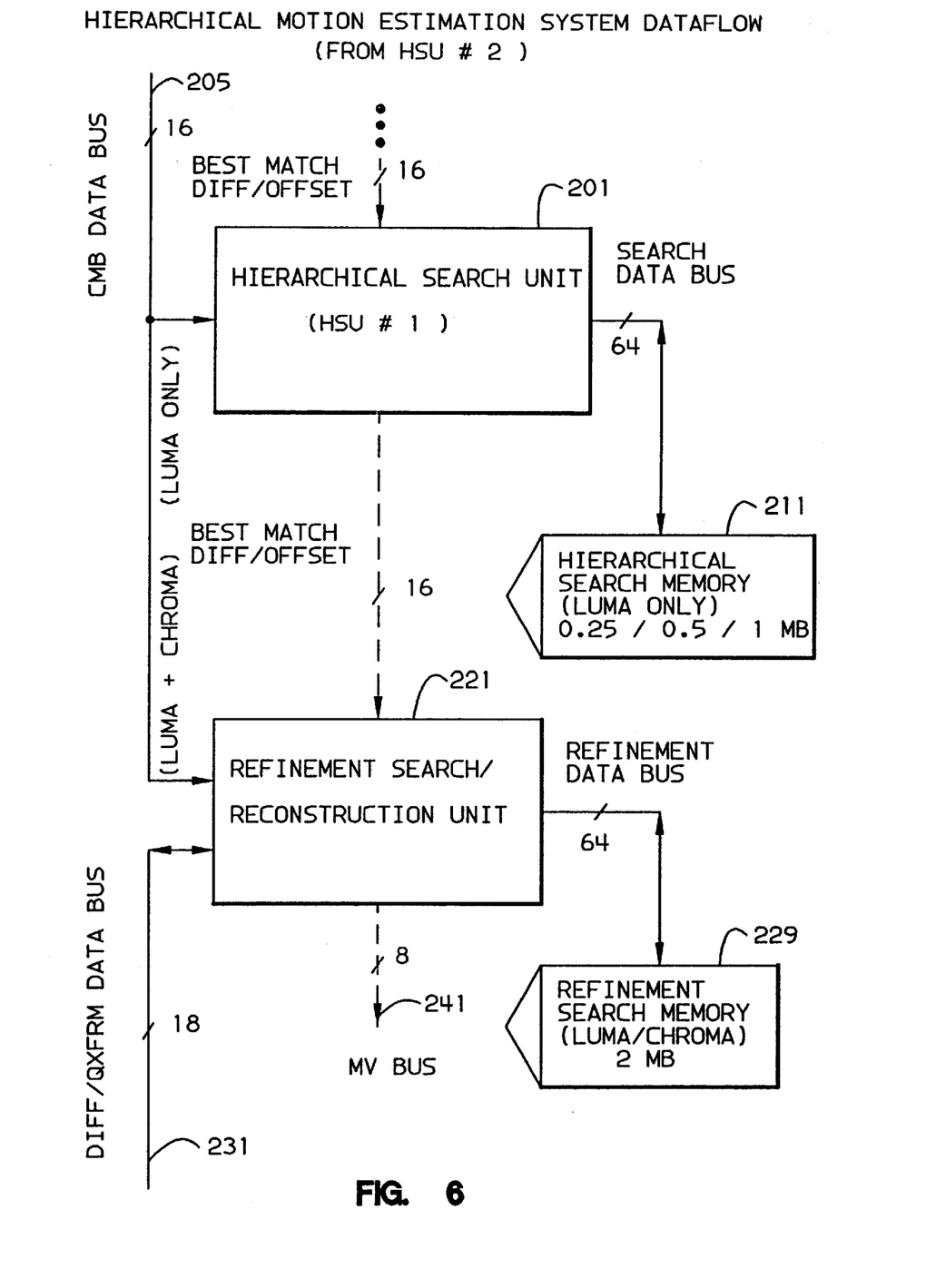
FIG. 6 shows the hierarchal motion estimation data flow, with a hierarchal search unit 201 receiving best match/difference offset data from a previous hierarchal search unit (not shown) and data from the Current Macro Block (CMB) data bus 205, and having output to a Refinement Search/Reconstruction Unit 221, and a Hierarchal Search Memory 211. The Refinement Search/Reconstruction Unit 221 receives data from the Current Macro Block data bus 205 and sends and receives data to and from the Diff/Qxfrm Data Bus 231 and the Refinement Search Memory 229. The output of the Refinement Search/Reconstruction Unit 221 is to the Motion Vector Bus 241.

An overview of the architecture of the invention is shown in FIGS. 5 and 6. As shown in FIG. 5, a two stage hierarchal processor structure is used, while as shown in FIG. 6, two-level hierarchal search approach is used.

The Current Macro Block Data Bus (CMB DATA BUS) 205 is used to input current macro block (CMB) luminance data to both the hierarchical search unit 201 and refinement search/reconstruction unit 221. This bus also provides CMB luminance and chominance data to the refinement search/reconstruction unit.

The hierarchical search unit 201 shown is normally used to perform its search operations using downsampled CMB data. The user may select the extent to which the data is downsampled, from a maximum of 4:1 horizontally to a minimum of 1:1 (i.e. non-downsampled). The number of such units used is scalable (1, 2 or 4) depending on the search range desired. The hierarchical search unit 201 stores and fetches luminance search data for both I- and P-frames in a hierarchical search memory. The size of the hierarchical search memory 211 is dependent on the extent to which the picture data is downsampled. The luminance search data stored is equivalent to the input current macroblock (CMB) data with downsampling applied if selected by the user. Upon completion of its search, the hierarchical search unit outputs the best match search result for a given current macroblock (CMB) based on the minimum absolute difference and its corresponding offset relative to the current macroblock (CMB) position, via the best match diff/offset bus. The description above is for luminance, but can also apply to chrominance and/or luminance and chrominance data.

Figure 8:
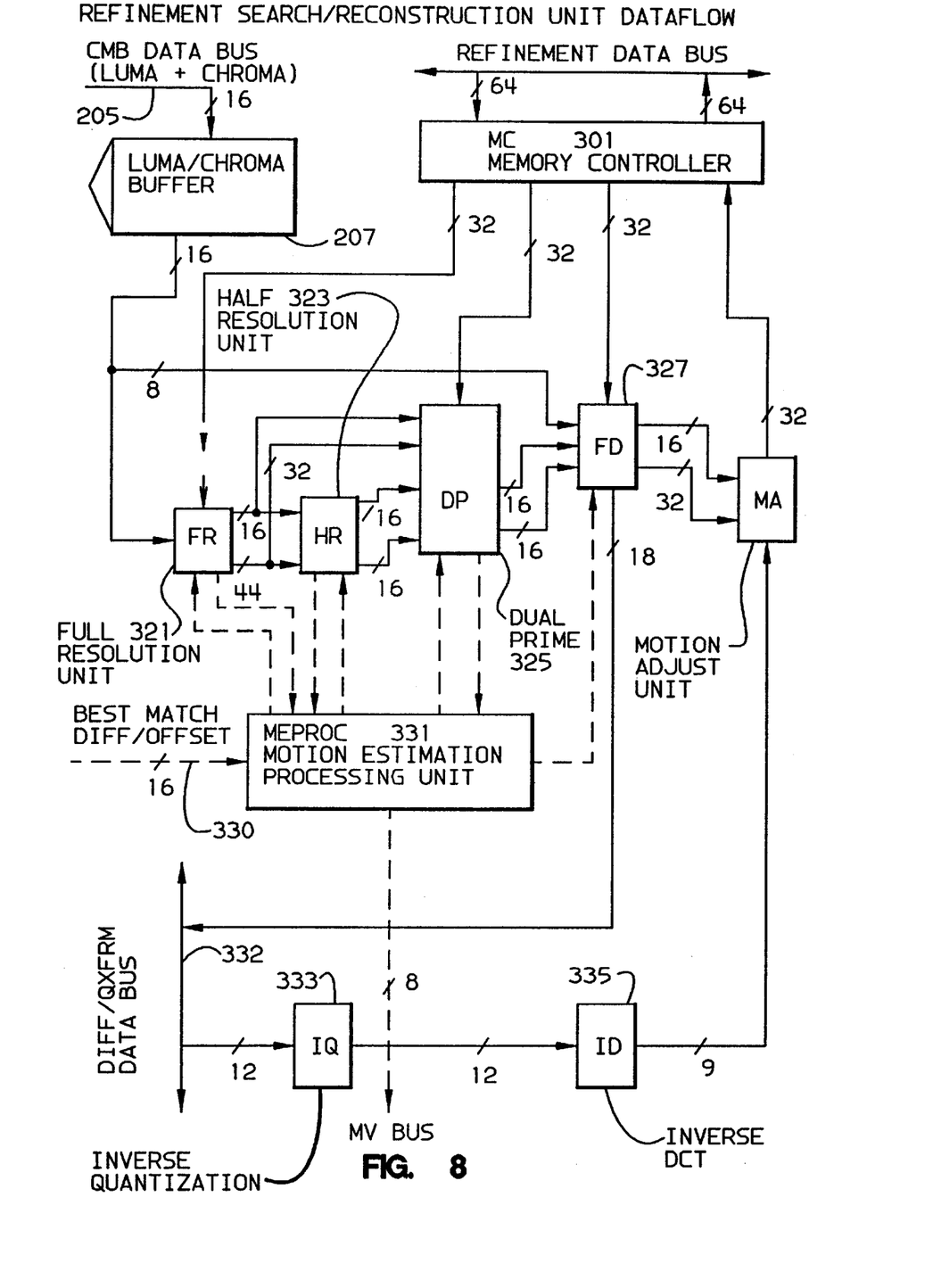
FIG. 8 shows the Refine-Search/Reconstruction Unit 221 data flow. Chrominance and luminance data enters the unit through the CMB data bus 205 and the LUMA/CHROMA buffer 207 under the control of the Memory Controller 301. The data goes through the Full Resolution Unit (FR) 321, and the Half Resolution Unit (HR), 323, to and through the Dual Prime Unit (DP) 325 to the FD Unit, 327, and from the FD Unit, 327, to the Motion Adjust Unit (MA), 329. The Motion Estimation Processing Unit (MEPROC), 331, controls these units and sends control signals to the Motion Vector Bus (MV Bus). The output of the FD Unit 327 goes to the Diff/QXFRM Data Bus, 332, and from there to the Inverse Quantizer (IQ), 333, and the Inverse Discrete Cosine Transform Unit (ID), 335, and back to the Motion Adjust Unit (MA), 329.

The refinement search/reconstruction unit 221 shown in FIGS. 5, 6, and 8 can operate in either a standalone environment (i.e., no hierarchical search unit attachment) for IP encoding or with a hierarchical search unit attached for IPB encoding. This unit 221 uses non-downsampled current macroblock (CMB) luminance data to perform its search operations against reconstructed past and/or future I- and P-frame data contained in the refinement search memory. Upon completion of its search, the refinement-search/reconstruction unit outputs either intra current macroblock (CMB) luminance and chrominance pixel data or non-intra current macroblock (CMB) luminance and chrominance minus the best match Refinement MB (RMB) luminance and chrominance pixel difference data on the DIFF/QXFRM DATA BUS 231. Furthermore, when non-intra difference data is output, the motion vector corresponding to the location of the best match reference macroblock (RMB) location relative to the current macroblock (CMB) location is output on the motion vector bus (MV BUS) 241.

Upon completion of the discrete cosine transformation (DCT) and quantization on the output intra data or non-intra difference data, the transformed luminance and chrominance blocks are input to the refinement-search/reconstruction unit via the DIFF/QXFRM DATA BUS 231 to allow the refinement-search/reconstruction unit 221 to properly reconstruct I- and P-frame data which is output to the refinement search memory. Extensive pipelining is utilized within each unit in order to meet the performance requirements for a real time encoding environment.

The overall search strategy adopted by the disclosed motion estimation architecture is broken down into the following pipelined components shown in FIGS. 6 and 8.

Figure 7:
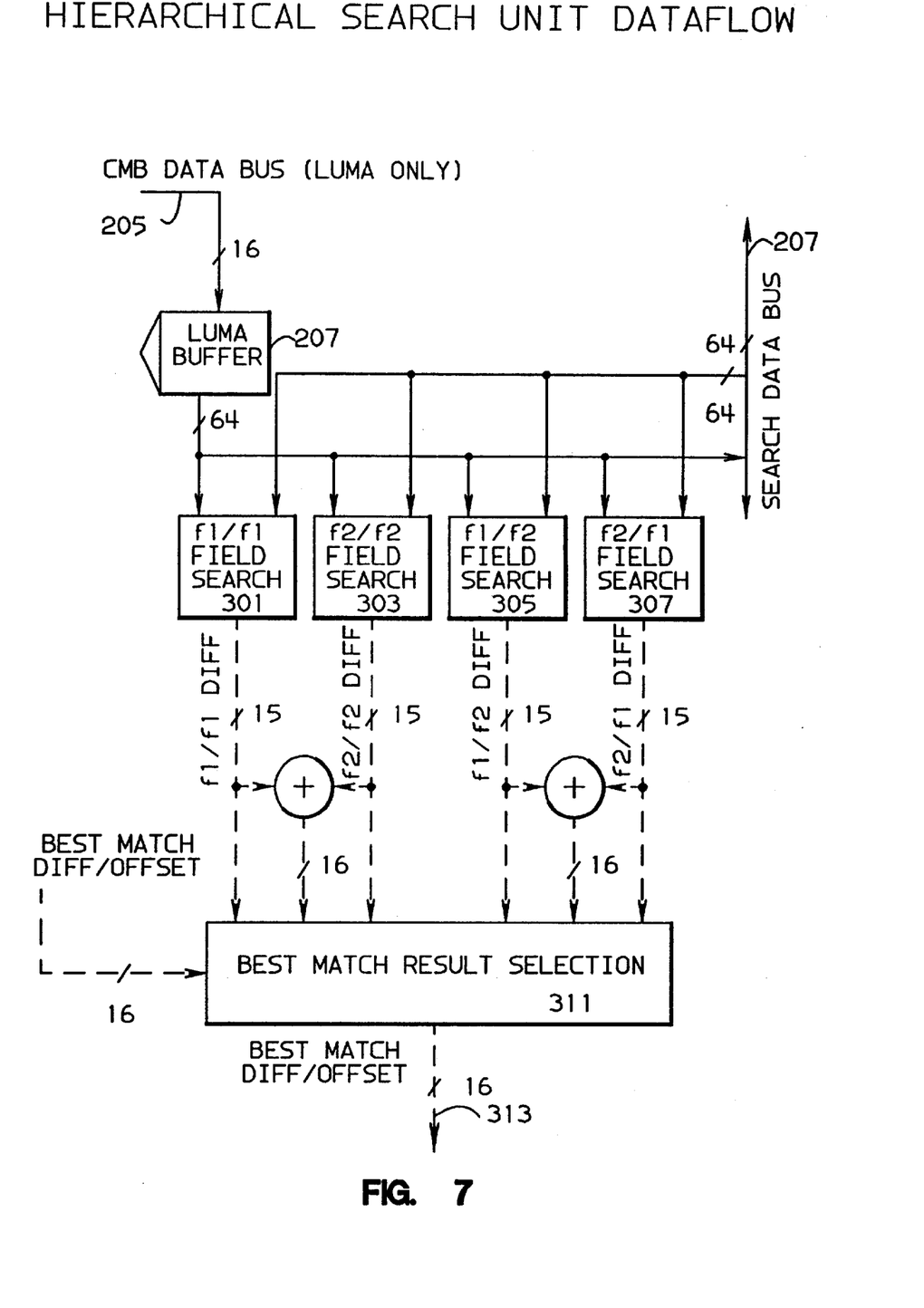
FIG. 7 shows the Hierarchical Search Unit Data Flow receiving data from the Current Macro Block Data Bus (Luminance Data only 205), through the Luminance Buffer 207, and receiving data from and passing data to the Search Data Bus 207. Four field searches are shown, f1/f1, 301, f2/f2, 303, f1/f2, 305, and f2/f1, 307. These provide, respectively, the f1/f1 difference, the f2/f2 difference, the f1/f2 difference, and the f2/f2 difference. These data go to the Best Match Result Selection Unit, 311, which outputs the Best Match Difference/Offset 313.

As shown in FIGS. 6 and 8, the hierarchical search unit 201 performs a typical search using downsampled (averaged) full pixel values. After the best downsampled match is determined using non-reconstructed current macroblock (CMB) data from past and/or future I- and P-frames, the refinement search unit 221 performs a non-downsampled full pixel search using reconstructed refinement search data around the offset of the best downsampled match. After the best non-downsampled full pixel match is determined, both half pixel and, optionally, dual prime (DP) refinement searches are performed using reconstructed refinement data based on the location of the best non-downsampled full pixel match. Based on the best match motion estimation result as determined by the minimum absolute difference value, the original current macroblock (CMB) or best match difference macroblock luminance and chrominance data is output if the macroblock is to be coded as intra or non-intra, respectively. Three different non-intra results are possible:

CMB-RMB Full Pixel Best Match
CMB-RMB Half Pixel Best Match
CMB-RMB Dual Prime Best Match The Hierarchical Search Unit is shown in FIGS. 5 and 6,. The dataflow diagram for this unit is illustrated in FIG. 7. As shown in the figure, current macroblock (CMB) luminance data is stored in the LUMA BUFFER 207. Downsampling of the data occurs at this point. In order to offer the user as much flexibility as possible in terms of search range and search memory size, the following downsampling options are available:

4:1—Stores four pixels for each pixel row of a MB by taking the average of every four successive pixel values of a row. This affords the largest search window per unit (+/−64 Horizontal, +/−56 Vertical) and requires the least amount of search memory (0.25 MB for two search reference frames).

2:1—Stores eight pixels for each pixel row of a MB by taking the average of every two successive pixel row values of a row. This affords the next largest search window per unit (+/−32 Horizontal, +/−32 Vertical) and requires the next largest amount of search memory (0.5 MB for two search reference frames).

1:1—Stores sixteen pixels for each pixel row (non-downsampled). This affords the smallest search window per unit (+/−16 Horizontal, +/−16 Vertical) and requires the largest amount of search memory (1 MB for two search reference frames).

The CMB data in either its downsampled or non-downsampled form is output from the LUMA BUFFER 207 to four FIELD SEARCH units, 301, 303, 305, and 307, as shown in FIG. 7. For I- and P-pictures, the current macroblock (CMB) data is also output to the hierarchical search memory via the search data bus. Note that the current macroblock (CMB) data is not output to the hierarchical search memory for B-pictures since the MPEG-2 standard precludes B-pictures from serving as reference frames. Search memory data for all macroblocks contained in the search window is also input to the four field search units. When using only one hierarchical search unit, the search data is fetched so that the search macroblock (SMB) at the center of the search window is at the same position as the CMB against which the search operation is being performed. When using two or four hierarchical search units, the search data is fetched so that the search macroblock (SMB) at the center of the combined search window among all the units is located at the previous picture's average motion vector offset position from the CMB location.

Field searching is done in the hierarchical search unit as shown in FIG. 7. The f1/f1 field search unit 301 handles searching of the current macroblock (CMB) odd lines against the search data odd lines. The f2/f2 field search unit 303 handles searching of the current macroblock (CMB) even lines against the search data even lines. The f1/f2 field search unit 305 handles searching of the current macroblock (CMB) odd lines against the search data even lines. The f2/f1 field search unit 307 handles searching of the current macroblock (CMB) even lines against the search data odd lines.

For each difference value output by these units, two additional frame search results are generated by combining the f1/f1 and f2/f2 field search results, and the f1/f2 and f2/f1 field search results. Each result is input to the best match result selection unit 311. The first step performed by this unit 311 is to add a weighting factor, referred to as the base weight, to each result. The base weight value varies according to the offset position of the search macroblock (SMB) relative to the previous picture's average motion. The farther away a given search macroblock (SMB) is relative to the previous picture's average motion vector offset from the current macroblock (CMB) position, the larger the base weight added to that search location's result. Thus, the search tends to favor SMB positions which most closely follow the previous picture's average motion trajectory.

The number of results output by this unit on the best match diff/offset bus is dependent on the format of the picture being searched. For frame (progressive) format searches, five results are output: four Best Match Field Search Results (f1/f1, f2/f2, f1/f2, f2/f1), one Best CMB Frame Search Result (minimum of f1/f1+f2/f2 diff and f1/f2+f2/f1 diff). For field (interlaced) format searches, two results are output: Best current macroblock (CMB) Same Parity Frame Search (minimum f1/f1+f2/f2 diff), Best CMB Opposite Parity Frame Search (minimum f1/f2+f2/f1 diff).

Furthermore, when performing search operations for B-pictures, two sets of these results are produced (one set for the past reference search, one set for the future reference search). In addition to the minimum absolute difference value, the offset location of the SMB which produced the minimum value is output.

As mentioned previously, multiple hierarchical search units can be used to increase the search window size. When two hierarchical search units are employed, a maximum search window size of +/−128 Horizontal, +/−56 Vertical or +/−64 Horizontal and +/−112 Vertical can be defined using 0.5 MB of search memory. When the maximum of four of these units are employed, a maximum search window size of +/−128 Horizontal, +/−112 Vertical can be defined using 1 MB of search memory. In a multiple hierarchical search unit configuration, the best match diff/offset results are passed in a daisy-chain fashion from one unit to another. In such a configuration, the first sender unit at the end of the daisy-chain passes its absolute difference and offset results to the first receiver unit. The first receiver unit compares its search results against those received from the first sender unit, and in turn transmits the minimum absolute difference and offset results to the second receiver unit. This process continues until the last receiver in the chain passes the final minimum absolute difference and offset results to the refinement search/reconstruction unit.

The Refinement Search/Reconstruction Unit is shown in FIGS. 5, 6, and 8. The dataflow diagram for this unit is illustrated with specificity in FIG. 8. As illustrated in the figure, current macroblock (CMB) luminance and chrominance data is received from the CMB DATA BUS 205 and stored in the LUMA/CHROMA BUFFER 207. The luminance data is the same as that received by the hierarchical search unit described previously. In order to most effectively pipeline the motion estimation process, the buffer is designed to hold luminance data for two MBs and chrominance data for one MB.

The first motion estimation refinement step performed occurs in the Full Resolution (FR) Unit 321. This unit fetches current macroblock (CMB) luminance data from the LUMA/CHROMA BUFFER 207 and Reference Macroblock (RMB) luminance data pertaining to the full pixel refinement search window from the refinement search memory via the MC (Memory Controller) Unit 301. The control information (address and fetch size) required by the full resolution unit (FR) 321 to perform the refinement data fetch is setup by the Motion Estimation Processing Unit (MEPROC) 331 based on whether a hierarchical or non-hierarchical (i.e., no hierarchical search unit) search is being performed. When operating in non-hierarchical search mode, the Motion Estimation Processing Unit (MEPROC) 331 centers the full pixel refinement search about the location of the current macroblock (CMB). When operating in hierarchical search mode, the Motion Estimation Processing Unit (MEPROC) 331 uses the hierarchical search unit results received across the BEST MATCH DIFF/OFFSET bus 330 in order to center the full pixel refinement search about the offset location. In order to meet real time performance requirements, the number and types of searches performed and the search window size vary depending on the search mode (hierarchical or non-hierarchical), picture structure and type, and motion estimation options selected by the user. Table 1 summarizes this information. Note that motion estimation searches are performed for I-pictures in order to generate error concealment motion vectors which the user may select to insert in the compressed bitstream.

Figure 9:
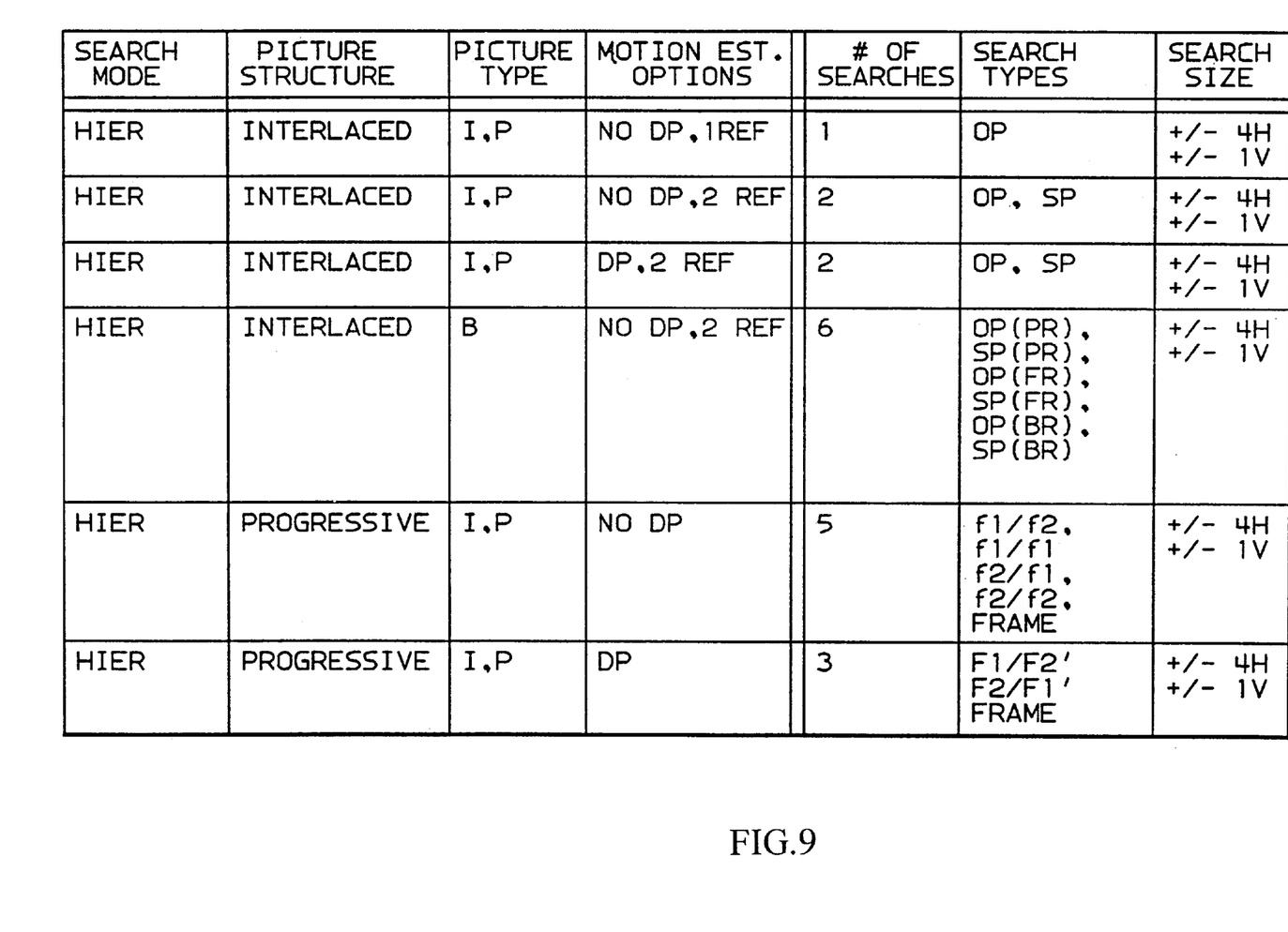
FIGS. 9 and 10 shows Table 1 which depicts the motion estimation search strategies, including search mode (hierarchical or non-hierarchical), picture structure (interlaced or progressive), picture type (intra, predicted, bidirectional), motion estimation options (dual prime, non-dual prime), number of searches, search type, and refinement size.
Figure 10:
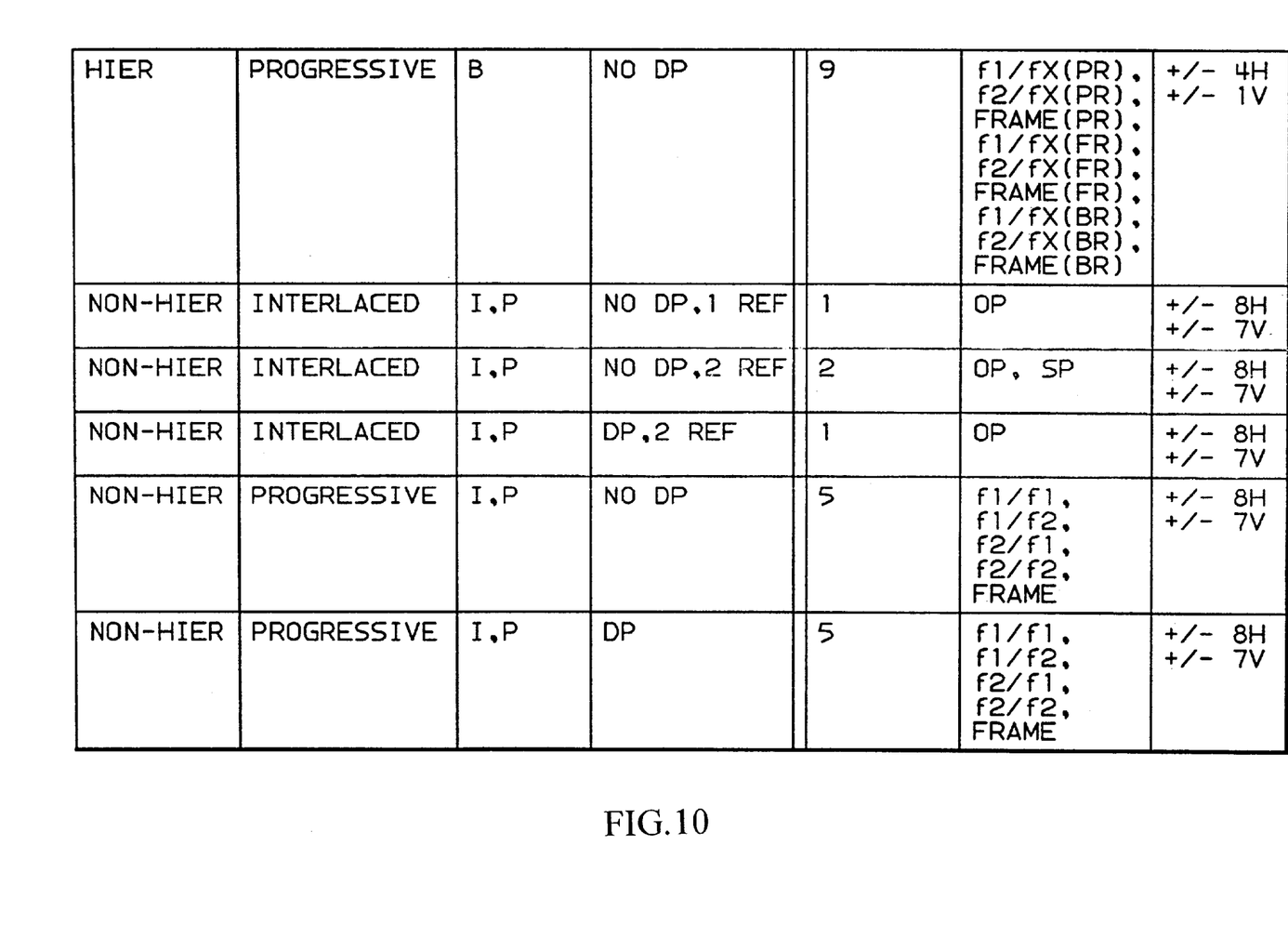

In Table 1, Hier refers to hierarchical search mode, Non-Hier refers to non-hierarchical search mode, DP refers to Dual Prime motion estimation, x Ref refers to whether 1 (opposite parity) or 2 (same parity and opposite parity) reference fields are specified for searching, OP refers to reference macroblock (RMB) field data of opposite parity with respect to the parity of the current macroblock (CMB), SP refers to reference macroblock (RMB) field data of the same parity with respect to the parity of the current macroblock (CMB), (PR) refers to the past refinement search data stored in refinement search memory, (FR) refers to the future refinement search data stored in refinement search memory, (BR) refers to the bidirectional interpolation (averaging) between past and future refinement search data stored in refinement search memory, f1/f1 refers to odd line refinement data used to search current macroblock (CMB) odd field lines, f1/f2 refers to even line refinement data used to search current macroblock (CMB) odd field lines, f2/f1 refers to odd line refinement data used to search current macroblock (CMB) even field lines, f2/f2 refers to even line refinement data used to search current macroblock (CMB) even field lines, f1/fx refers to either odd or even line refinement data used to search current macroblock (CMB) odd field lines based on whether the f1/f1 or f1/f2 hierarchical search unit result, respectively, produced the better match, and f2/fx refers to either odd or even line refinement data used to search current macroblock (CMB) even field lines based on whether the f2/f1 or f2/f2 hierarchical search unit result, respectively, produced the better match. Upon determining the absolute difference value for each search location, a base weight factor is added to each result in the same manner as described for the hierarchical search unit. The final best match result for each type of search performed is determined by the minimum absolute difference plus base weight value.

Upon completion of its search operations, the FR Unit outputs the CMB data along with enough refinement data surrounding each RMB best match to perform up to eight half pixel MB searches. For interlaced pictures, either one (OP Field) or two (SP Field, OP Field) best match reference macroblock (RMB) search areas are output, while for progressive pictures, two field best match reference macroblock (RMB) search areas (best CMB f1 match, best CMB f2 match) and one best match reference macroblock (RMB) frame search area are output. Note that a 44 bit bus is used to transmit the best match reference macroblock (RMB) search area data since each reference macroblock (RMB) best match pixel value is represented by an 11-bit byte when bidirectional reference macroblock (RMB) data produces the best match in a B-picture (refer to U.S. patent application Ser. No. 08/411,100 and U.S. patent application Ser. No. 08/602,472, both hereby incorporated herein by reference). In addition, the best match absolute difference and offset results for each best match RMB search area are output to the MEPROC Unit.

A second motion estimation refinement step performed occurs in the Half Resolution (HR) Unit 323. This unit performs a refinement search for up to eight half pixel reference macroblocks (RMBS) which surround the best match full pixel reference macroblock (RMB) as determined by the full resolution (FR) Unit 321. Upon determining the best match half pixel reference macroblock (RMB) location (i.e., the one which produced the minimum absolute difference value) for a particular search operation, both the best match absolute difference value and its corresponding half pixel offset are output to the motion estimation processor unit (MEPROC) Unit 331. The motion estimation processor (MEPROC) Unit 331 then compares the best match absolute difference values received from the full resolution (FR) 321 and half resolution (HR) Units 323, and instructs the half resolution (HR) Unit 323 to output the reference macroblock (RMB) full or half pixel luminance data which produced the minimum absolute difference value for each search operation performed. The half resolution unit (HR Unit) outputs this data, along with the corresponding current macroblock (CMB) data, to the dual prime unit (DP Unit).

Another motion estimation refinement step which is performed occurs in the Dual Prime Unit (DP) 325. This unit can be configured to perform Dual Prime refinement using current macroblock (CMB) and reference macroblock (RMB) data from either the full resolution (FR) or half resolution (HR) Unit 323. Furthermore, for interlaced (field) pictures, the unit may be configured to use either the same or opposite parity reference macroblock (RMB) when two reference fields are supplied. By using the default mode which performs Dual Prime motion estimation using full resolution unit (FR Unit) 321 current macroblock (CMB) and reference macroblock (RMB) data, two advantages are realized:

First, performance is optimized since the half resolution (HR) 323 and dual prime (DP) 325 unit search operations will occur in parallel.

Second, for progressive (frame) pictures, the invalid case in which the half resolution (HR) reference macroblock (RMB) frame best match involves vertical interpolation between opposite parity fields is eliminated. This increases the probability that valid Dual Prime refinement can be performed for a given current macroblock (CMB) from 33% to 100%.

Based on the offset information received from the hierarchical search unit, the full resolution unit (FR Unit) 321 and the half resolution unit (HR Unit) 323 (if selected for providing data for Dual Prime refinement to the DP Unit 325), the motion estimation processor (MEPROC) 331 formulates a motion vector which points to the Dual Prime reference macroblock (RMB). The motion estimation processor (MEPROC) 331 then performs the appropriate motion vector scaling operations and converts the scaled vector(s) into the appropriate refinement search memory location(s) from which to fetch additional luminance refinement search data used to perform Dual Prime motion estimation. Once the Dual Prime best match is determined, both the corresponding absolute difference value and offset are output to the motion estimation processor (MEPROC) Unit 331. The motion estimation processor (MEPROC) Unit 331 then decides which of the stet three results produced the overall best match depending on the picture structure as follows:

Progressive
   Best Match Frame Reference Macroblock (RMB),
   Best Match Combined f1 and f2 Field Reference Macroblock (RMB),
   Best Match Dual Prime Reference Macroblock (RMB).

Interlaced Best
   Match Opposite Parity Field Reference Macroblock (RMB),
   Best Match Same Parity Field Reference Macroblock (RMB),
   Best Match Dual Prime Reference Macroblock (RMB).

The motion estimation processor (MEPROC) 331 informs the dual prime (DP) unit 325 which reference macroblock (RMB) result to output to the FD Unit 327. At this point, the refinement motion estimation phase is complete.

The next unit which starts the macroblock (MB) reconstruction phase is the FD Unit 327. This unit gathers current macroblock (CMB) and the best match reference macroblock (RMB) luminance data from the dual prime (DP) Unit 325 and fetches the corresponding current macroblock (CMB) chrominance data from the LUMA/CHROMA BUFFER 207, and fetches reference macroblock (RMB) chrominance data from the refinement search memory for non-intra coded macroblocks. Based on information received from the motion estimation processor (MEPROC) 331 indicating whether the current macroblock (CMB) is to be coded as intra or non-intra, this unit will process the luminance and chrominance data in different ways. If the decision is intra (no motion), then the FD Unit will output current macroblock (CMB) luminance and chrominance data directly to the DIFF/QXFRM DATA BUS 332, and send reference macroblock (RMB) luminance and chrominance data of all '00's to the MA (Motion Adjust) Unit 329. If the decision is non-intra (motion), then the FD Unit 327 will output CMB-RMB luminance and chrominance data to the DIFF/QXFRM DATA BUS, and send the selected reference macroblock (RMB) luminance and chrominance data to the motion adjust (MA) Unit 329. In the non-intra case, the motion estimation processor (MEPROC) Unit 331 initializes refinement search memory pointers in the FD Unit 327 to fetch the required reference macroblock (RMB) chrominance data so that the CMB-RMB chrominance difference can be calculated. Note that the FD Unit is responsible for proper arbitration of the DIFF/QXFRM DATA BUS 332. This is accomplished by assuring that the luminance (or chrominance) data transmitted by this unit is returned in its entirety to the IQ (Inverse Quantization) Unit 333 prior to transmission of the next chrominance (or luminance) data. The data output by the FD Unit 327 is additionally tagged with a motion vector by the motion estimation processor (MEPROC) Unit 331 for non-intra macroblocks. The motion vector data is output by the motion estimation processor (MEPROC) Unit to the motion vector bus (MV BUS).

Upon application of the discrete cosine transform (DCT) and quantization transforms to the data output by the FD Unit, this data is returned in block format to the IQ (Inverse Quantization) Unit 333 for reconstruction (decoding) of the transformed and quantized data. Both the IQ 333 and ID (Inverse DCT) 335 Units perform the inverse quantization and inverse discrete cosine transform functions specified by the MPEG-2 standard. Thus, a lossy version of the original luminance and chrominance MB data output by the FD Unit 327 is obtained which exactly corresponds to how an external MPEG-2 decoder will uncompress the macroblock. This lossy luminance and chrominance macroblock data is sent to the MA (Motion Adjust) Unit, which adds to this data the reference macroblock (RMB) data which it previously received from the FD Unit. The resultant luminance and chrominance macroblock data is then output to the refinement search memory via the MC Unit for all I- and P-pictures which are processed.

While our invention has been described with respect to certain preferred embodiments and exemplifications, it is not intended to limit the scope of the invention thereby, but solely by the claims appended hereto.

We claim:

1. A method of temporal compression of a digital video data stream, comprising the steps of:
   hierarchically searching in at least one heirarchical search unit for pixels in a reference picture to find a best match macroblock therein corresponding to a current macroblock;
   constructing a motion vector of offset between the best match macroblock and the current macroblock;
   passing the motion vector from the at least one heirarchical search unit to a refinement search unit; and
   performing a refinement search around the offset of the best match macroblock.

2. The method of claim 1 comprising conducting multiple hierarchical searches in multiple search units to increase search window size.

3. The method of claim 2 comprising passing best match macroblock difference and offsets in daisy chain fashion from one search unit to the next search unit.

4. A method of temporal compression of a digital video data stream comprising using downsampled full pixel values to search for pixels in a reference picture to find a best match macroblock therein corresponding to a current macroblock, and constructing a motion vector of offset between the best match macroblock and the current macroblock and thereafter conducting a non-downsampled full pixel search using reconstructed refinement search data around the offset of the best match macroblock.

5. The method of claim 4 comprising using 2:1 downsampled pixel values, or 4:1 downsampled pixel values.

6. The method of claim 4 wherein the next picture is to be intra coded and the output is the original current macroblock.

7. The method of claim 4 where the next picture is to be bidirectionally coded or prediction coded and the output is the best match difference macroblock.

8. The method of claim 4 further comprising searching for the best match macroblock using nonreconstructed reference macroblock data.

9. The method of claim 4 further comprising thereafter performing a half pixel search using reconstructed refinement data based on the offset of the best match non-downsampled full pixel best match macroblock.

10. The method of claim 9 further comprising performing a dual prime search.

11. A method of temporal compression of a digital video data stream, comprising the steps of:
   field searching with even/even, odd/odd, even/odd, and odd/even field search unit inputs;
   forming a same parity frame search by combining the even/even and odd/odd searches;

forming an opposite parity frame search by combining the even/odd and odd/even searches;

selecting a best match macroblock from the search units and the frame searches; and constructing a motion vector between the best match macroblock and the current macroblock.

12. A search processor for digital video motion estimation, said search processor comprising:

a hierarchical search unit; and a refinement search unit connected to the heirarchical search unit via a best match diff/offset bus.

13. The search processor of claim 12 wherein said heirarchical search unit comprises downsample full pixel search means.

14. The search processor of claim 12 wherein said refinement search unit comprises full pixel search means, half pixel search means, and dual prime search means, said full pixel search means in series with said half pixel search means and said dual prime search means, and said half pixel search means in series with said dual prime search means.

* * * * *